(12) United States Patent
Wang et al.

(10) Patent No.: US 7,027,731 B1
(45) Date of Patent: Apr. 11, 2006

(54) USER-CONSTRAINED OPTICAL ROUTE FLOODING SYSTEM AND METHOD

(75) Inventors: Guo Qiang Wang, Nepean (CA); Guoli Yin, Nepean (CA)

(73) Assignee: Nortel Networks Limited, St. Laurent (CA)

(*) Notice: Subject to any disclaimer, the term of this patent is extended or adjusted under 35 U.S.C. 154(b) by 524 days.

(21) Appl. No.: 09/892,569

(22) Filed: Jun. 28, 2001

(51) Int. Cl.
*H04J 14/00* (2006.01)
*G01R 31/08* (2006.01)
*G06F 11/00* (2006.01)
*H04L 12/28* (2006.01)
*H04L 12/56* (2006.01)

(52) U.S. Cl. .............................. 398/45; 398/50; 398/51; 398/49; 398/57; 370/230; 370/231; 370/235; 370/401

(58) Field of Classification Search ................. 398/45, 398/48, 50, 51, 55, 56, 57; 370/229, 230, 370/231, 235, 236, 254, 350, 400, 401
See application file for complete search history.

(56) References Cited

U.S. PATENT DOCUMENTS

2003/0026212 A1* 2/2003 Martin ....................... 370/254

OTHER PUBLICATIONS

"Generalized multiprotocol label switching: an overview of routing and management enhancements"; Banerjee et al., IEEE Communications Magazine, vol. 39, Issue 1, Jan. 2001, pp. 144-150.*
"User Network Interface (UNI) 1.0 Signaling Specification", OIF2000.125.3, Dec. 2000, http://www.cse.ohio-state.edu/~jain/oif/ftp/oif2000.125.3.pdf.*
Pendarakis et al., "Routing Information Exchange in Optical Networks", Oct. 28, 2000, http://www.watersprings.org/pub/id/draft-prs-optical-routing-00.txt.*
Moy, "OSPF Version 2", Apr. 1998, http://www.faqs.org/ftp/rfc/pdf/rfc2328.txt.pdf.*

* cited by examiner

*Primary Examiner*—M. R. Sedighian
*Assistant Examiner*—Nathan Curs
(74) *Attorney, Agent, or Firm*—Hunton & Williams LLP

(57) ABSTRACT

A technique for providing user domain constrained optical route flooding for multiple optical networking service modes is disclosed. In one embodiment, the technique is realized by a method for routing information over an optical network having multiple optical service models. The method comprises receiving a link state advertisement including an incoming optical interface descriptor at an optical switch, checking an outgoing optical interface descriptor for an outgoing link; flooding the link state advertisement over the outgoing link if the outgoing optical interface descriptor has a first pre-defined value, blocking the link state advertisement if the outgoing optical interface descriptor has a second pre-defined value, and comparing the ingoing and outgoing optical interface descriptors if the outgoing optical interface descriptor has neither the first pre-defined value nor the second predefined value and flooding the link state advertisement only if the incoming user group identifier matches the outgoing optical interface descriptor.

26 Claims, 24 Drawing Sheets

| | |
|---|---|
| OPTICAL INTERFACE DESCRIPTOR 110 | USER TERMINATION POINT 112 |
| | USER GROUP ID 114 |
| | USER CONTRACT ID 116 |
| | USER SERVICE MODE 118 |
| OPTICAL LINK ADMINISTRATIVE DOMAIN 120 | CUSTOMIZED-LINK RELATED (LINK COLOR) 122 |
| | BROADCAST 123 |
| | BLOCK (DEFAULT) 124 |
| | OPTICAL INTERFACE DESCRIPTOR 125 |
| SERVICE LSA 130 | OPTICAL INTERFACE DESCRIPTOR TLV 132 INCLUDING |
| | USER SERVICE TYPE (ATM, IP, ETC.) |
| | CONTROL PROTOCOL (BGP, PNNI, ETC.) |
| | FRAMING PROTOCOL (GE, OX-c, FIBER CHANNEL, ETC., LINK COLOR) |
| | LINK COLOR |
| | OPTICAL INTERFACE DESCRIPTOR |

FIG. 8

| SERVICE MODE  A | SERVICE LSA  B | OPTICAL LSA  C | OTHER LSA  D |
|---|---|---|---|
| NONE (0)  A0 | BLOCK  B0 | BLOCK  C0 | BLOCK  D0 |
| OVERLAY MODE (1)  A1 | FLOODING  B1 | BLOCK  C1 | BLOCK  D1 |
| AUGMENTED MODE (2)  A2 | FLOODING  B2 | FLOODING  C2 | BLOCK  D2 |
| PEER-TO-PEER MODE (3)  A3 | FLOODING  B3 | FLOODING  C3 | FLOODING  D3 |

FIG. 15

USER-CONSTRAINED OPTICAL ROUTE FLOODING SYSTEM AND METHOD

FIELD OF THE INVENTION

The present invention relates generally to a method and system for providing optical route flooding for hybrid optical service modes and more particularly, to a technique for providing user domain constrained optical route flooding for multiple optical networking service modes.

BACKGROUND OF THE INVENTION

In the present state of the art, various optical networking service models are available. The optical networking models serve different types of users including trusted and untrusted users and provide a variety of optical services. These optical networking models include: (1) an overlay model as shown in FIG. 1(A); (2) a peer to peer model as shown in FIG. 1(B); and (3) an augmented model as shown in FIG. 1(C).

As shown in FIG. 1(A), in the overlay model, an optical domain 10a is separated from another service layer domain such as the IP routing domain 10b. The IP routing domain 10b is a client layer of the optical domain 10a while the optical domain 10a is a server layer to provide light path services for the IP layer through an optical User-to-Network Interface (UNI) 10c. Generally, the overlay model is for the untrusted user. No optical routes are disclosed to the user. Optical service providers own all optical resources. IP routing is independent from the optical networks. User signal bandwidth and protection are offered via the UNI signaling protocol.

The peer-to-peer model, as shown in FIG. 1(B) is appropriate for the trusted user. User signal bandwidth and protection are available via an extended Internet protocol. The trusted user owns some or all of the optical resources via a unified IP/optical routing protocol. In the peer-to-peer model, the IP domain 11a and the optical domain 11b are on the same level and communicate over an optical Network-to-Network Interface (O-NNI) 11c. IP routers typically treat optical switches as another type of router. Thus the IP domain 11a and optical domain 11b can exchange routing information seamlessly.

The augmented model shown in FIG. 1(C) is also for the trusted user. In the augmented model, the IP layer acts as a peer of the optical layer network, such that a single protocol instance runs over both the IP domain and the optical domain. Unlike the peer-to-peer model in which the routing domain is the "flat" space, the augmented model restricts the routing information of an optical domain 12a only at a boundary 12c between the IP layer 12d and optical switch 12a. In other words, only the optically attached router will exchange routing information with the optical switch 12a via an integrated UNI.

A problem with the current state of the art is that no mechanism is available for simultaneously supporting all three of the desirable optical networking service models described above. Such a mechanism would provide needed service flexibility, service domain partitioning and traffic engineering.

In view of the foregoing, it would be desirable to provide a technique for simultaneously supporting optical network service models for both trusted and untrusted users, which overcomes the above-described inadequacies and shortcomings. More particularly, it would be desirable to provide a technique for efficiently partitioning and managing overall network resources in an efficient and cost effective manner.

SUMMARY OF THE INVENTION

According to the present invention, a technique for efficiently partitioning and managing overall network resources in an efficient and cost effective manner is provided.

In one embodiment, the technique is realized by a method for routing information over an optical network having multiple optical service models. The method comprises receiving a link state advertisement at a switch; checking flooding domain information to decide whether to broadcast or block propagation of the link state advertisement, wherein checking the flooding domain information comprises checking an optical UNI interface type, an optical interface descriptor, and available bandwidth; and accepting or rejecting the request based on the flooding domain information.

In accordance with other aspects of the present invention, a method is provided for routing information over an optical network having multiple optical service models. The method comprises receiving a link state advertisement including an incoming optical interface descriptor at an optical switch; checking outgoing link information; flooding the link state advertisement over the outgoing link if the outgoing link information includes a first pre-defined value; blocking the link state advertisement if the outgoing link information includes a second pre-defined value; and comparing the incoming optical interface descriptor with the outgoing link information if the outgoing link information includes neither the first pre-defined value nor the second predefined value and flooding the link state advertisement only if the incoming optical interface descriptor and the outgoing link information include matching values.

In accordance with still further aspects of the present invention, a system is provided for routing information over an optical network having multiple optical service models. The system comprises wavelength routing protocol means for flooding a link state advertisement to an optical switch; means for checking an optical interface descriptor and outgoing link information to determine whether to broadcast or block propagation of the link state advertisement; and wavelength distribution protocol means for issuing a connection request upon receiving a broadcast determination.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 8 is a chart showing the contents of the optical interface descriptor, Service LSA, and administrative domain;

FIG. 15 is a chart showing proposed flooding restrictions;

DETAILED DESCRIPTION OF EXEMPLARY EMBODIMENT(S)

Figure 1A:
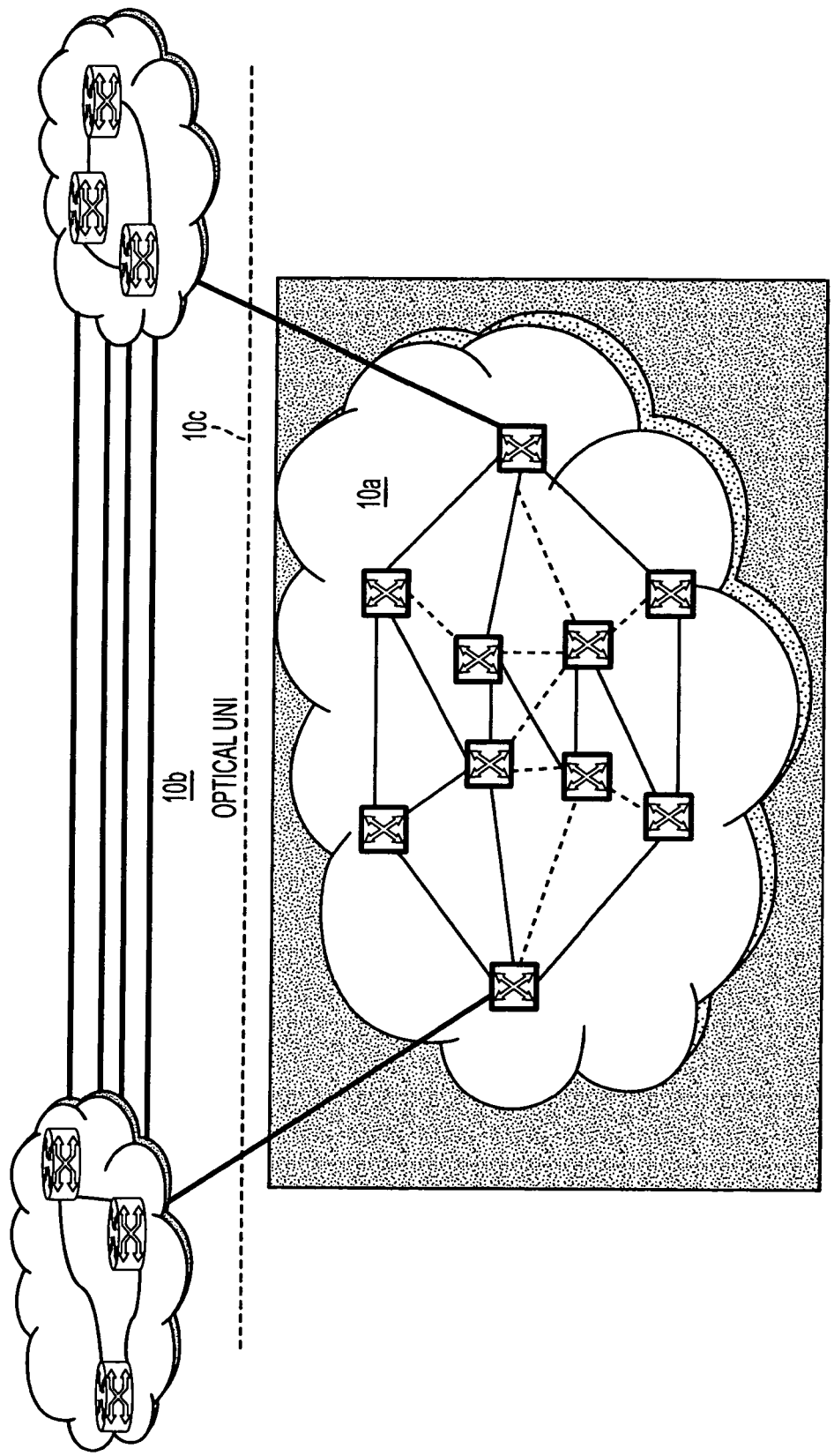
FIGS. 1(A)–1(C) are block diagrams illustrating three service models known in the art.
Figure 1B:
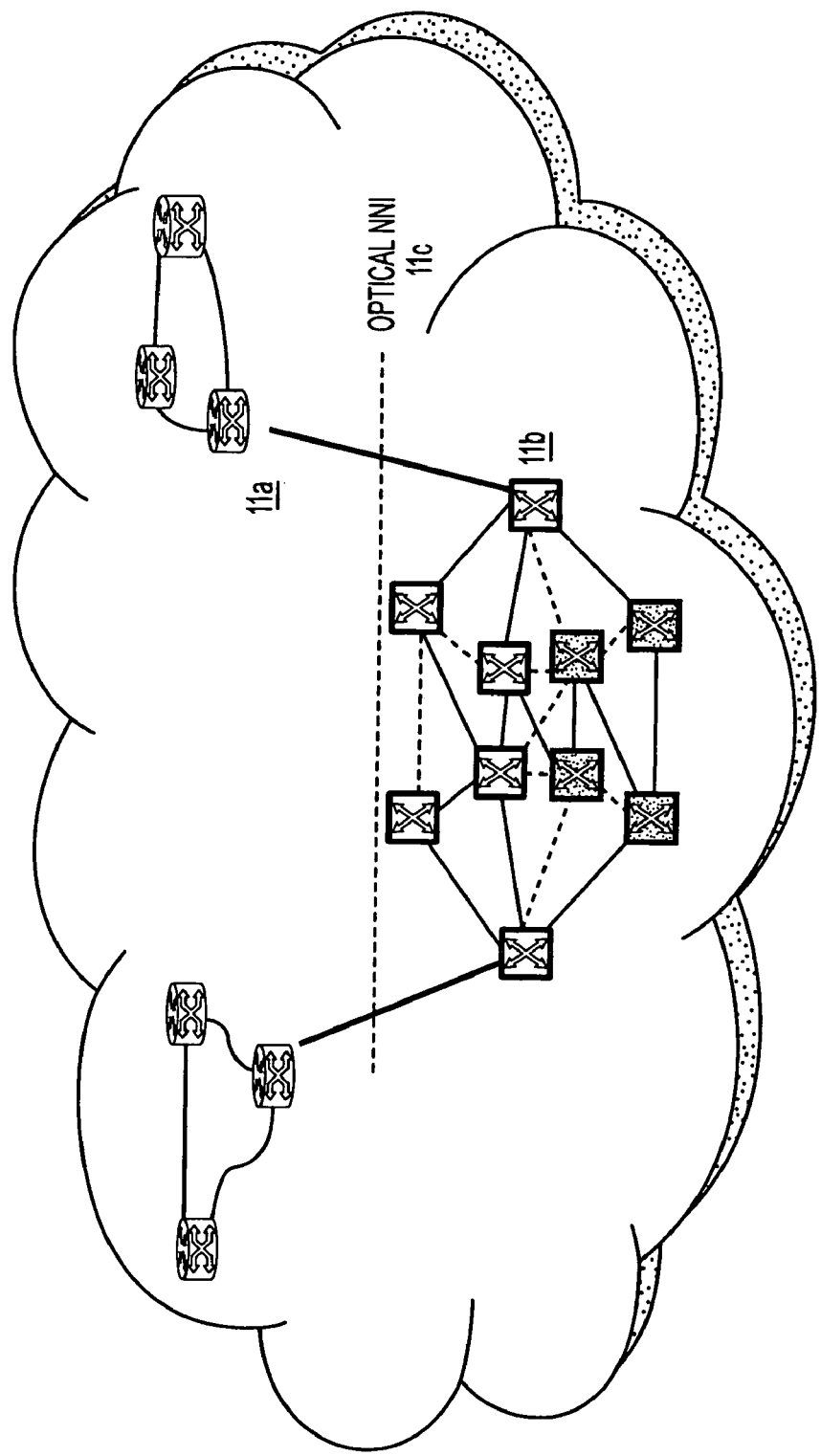
Figure 1C:
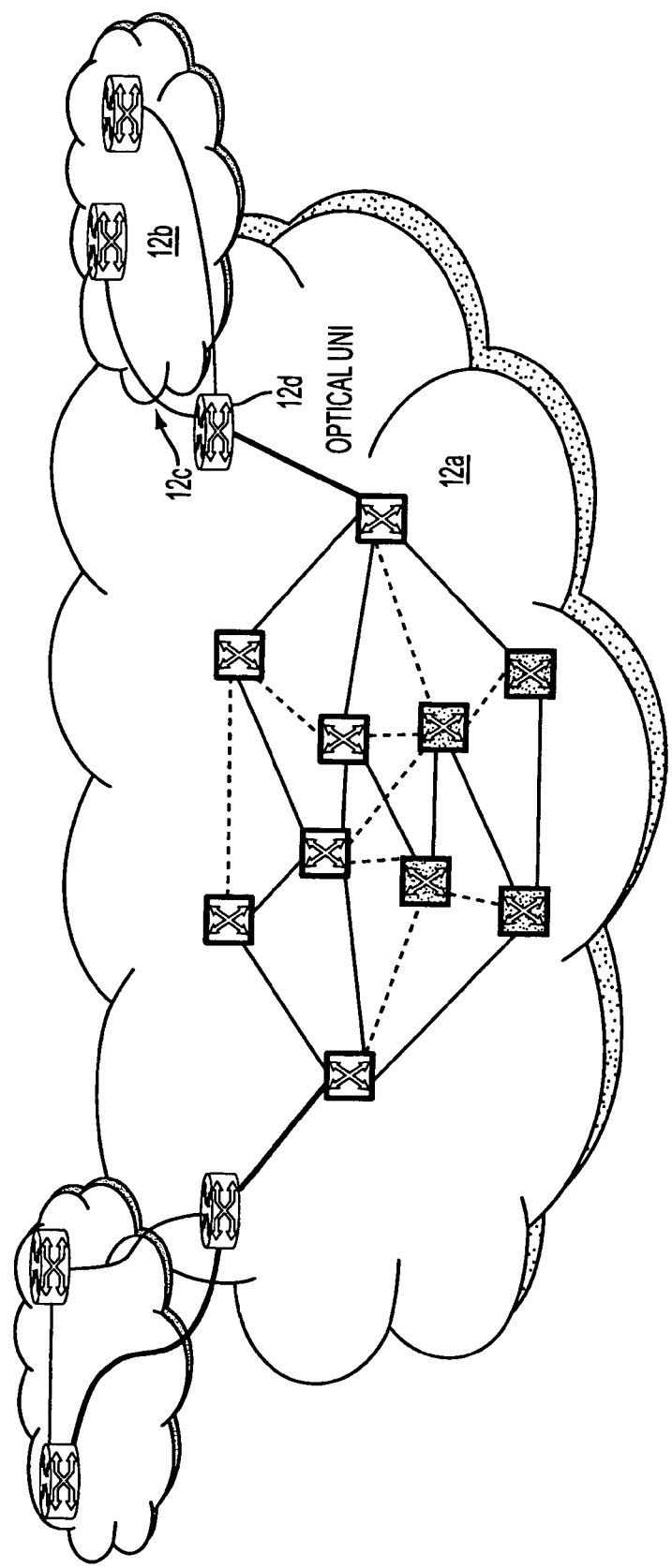

Referring to FIG. 1(A)–1(C), three existing service models are shown. All of these three service models are supported by the system of the invention. Each of the three models, including the overlay model of FIG. 1(A), the peer to peer model of FIG. 1(B), and the augmented model of FIG. 1(C) is described above in the Background of the Invention.

Figure 2:
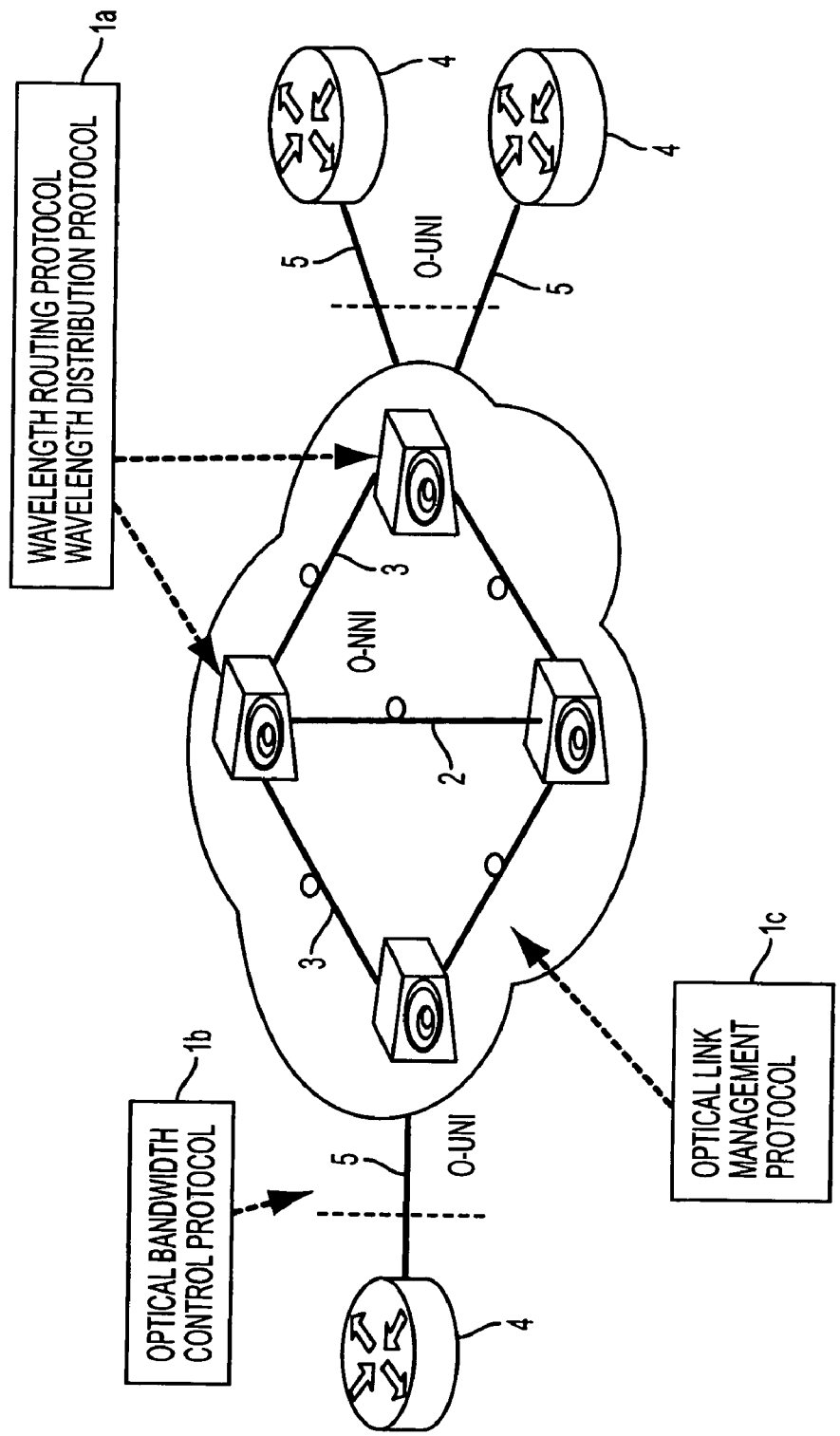
FIG. 2 is a flow chart illustrating the operation of optical intelligent protocols.

FIG. 2 is a block diagram illustrating the operation of several different optical intelligent protocols 1a–1c operating on a plurality of networks 2 which are connected by optical network-to-network interfaces (O-NNIs) 3. The networks 2 are connected with users 4 through optical user-to-network interfaces (O-UNIs) 5. Wavelength routing protocol (WRP) and wavelength distribution protocol (WDP) 1a control routing and distribution between the networks 2 over the NNIs 3. Optical bandwidth control protocol (OBCP) 1b controls exchanges between a user 4 and a network 2 over an O-UNI 5. Optical link management protocol (OLMP) operates between the networks 2. In summary, WRP and WDP perform routing and signaling functions. OBCP provides O-UNI services, and OLMP provides link management and fault isolation.

Each of the above-described protocols serves multiple functions in the system of the invention. WRP performs optical topology discovery and inventory of physical resources. WRP further locates available or reserved resource advertisements and performs optical bandwidth grouping at various channel granularities. WRP is the primary protocol for O-UNI interworking and control integration. WRP is responsible for channel/link pre-authorization advertisement. Another primary function of WRP is to execute new path selection using an optimization algorithm to support traffic engineering and constraint based routing. WRP ensures that all interfaces are IP addressable and secures integrated protection/restoration.

WDP provides a classified label for connection type and bandwidth. WDP further enables end-to-end signing for setup, tear-down, and modification of optical paths. WDP is further responsible for ensuring optical traffic/interface compatibility, bandwidth assignment for optical switches, and path priority assignment for protection and traffic engineering.

OBCP has various service functions including O-UNI registration/de-registration, connection request and release, bandwidth modification service status inquiry, service signaling and protection, and neighbor discovery and service discovery. OBCP further provides optical augment routing, third party signaling and service scheduling, O-VPN services, service policy enforcement, and service billing.

Finally, OLMP facilitates neighbor discovery, link type identification, wavelength scope identification and negotiation, and link bundling. OLMP further provides control channel management and protection, component link verification, fault detection, and fault isolation.

Figure 3:
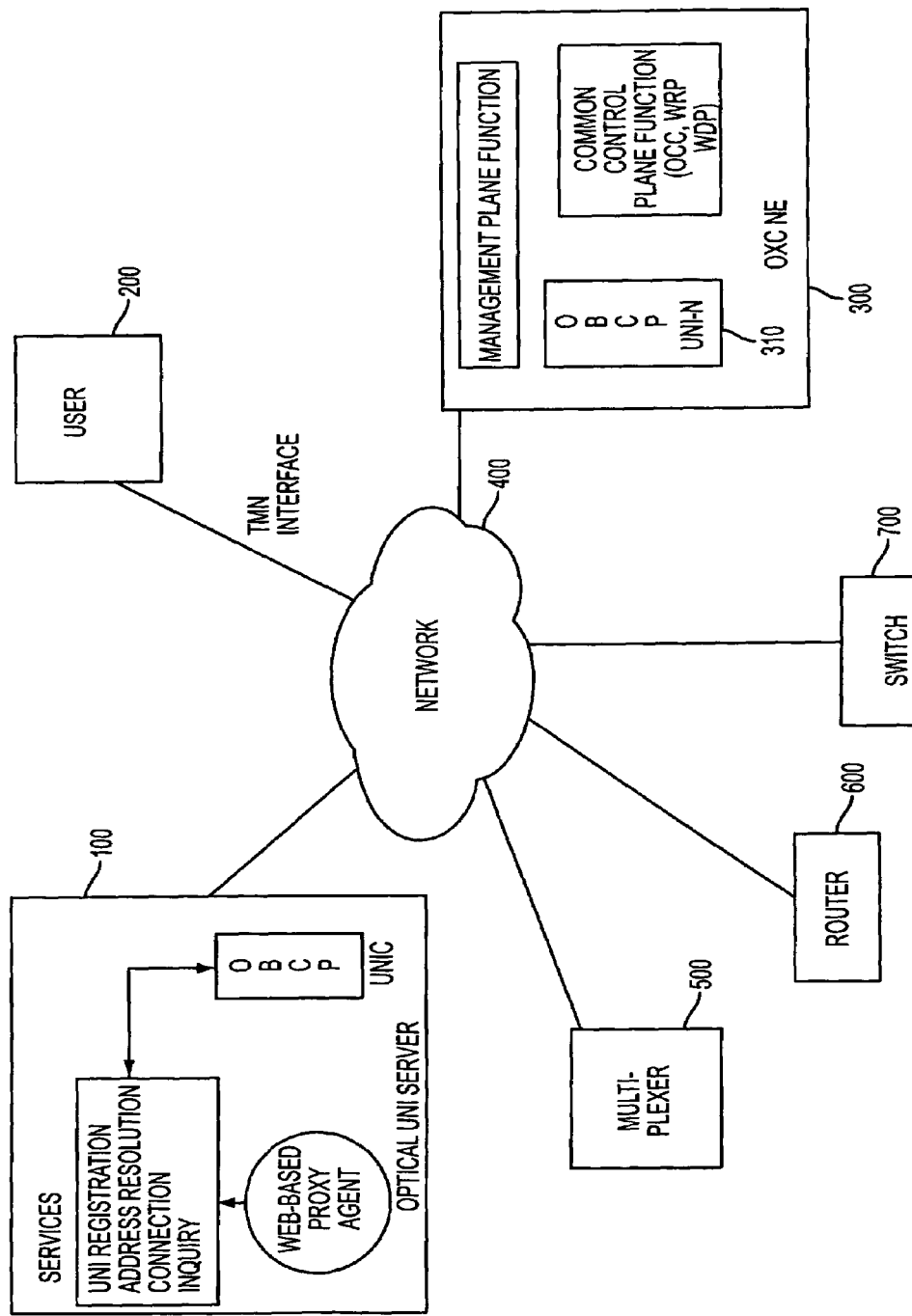
FIG. 3 is a block diagram illustrating a system for implementing flooding restrictions of the invention.

FIG. 3 illustrates a system for implementing an optical user-to-network interface (O-UNI) client-server distributed architecture. An O-UNI server 100, a client 200, and a management system 300 are connected over a control network 400. A multiplexer 500, a router 600, and a switch 700 are connected to the network 400 and to the management system 300 via two types of physical connections. One is a control access link to exchange control information. One is a data access link for payload traffic. An O-UNI is registered by an optical bandwidth control protocol (OBCP) 310. The OBCP 310 manages connection requests, bandwidth changes, service status inquiries, service signaling and protection, and neighbor discovery and service discovery. The OBCP 310 also manages optical augment routing, third party signaling and scheduling services, O-VPN services, service policy enforcement, and service billing.

Figure 4:
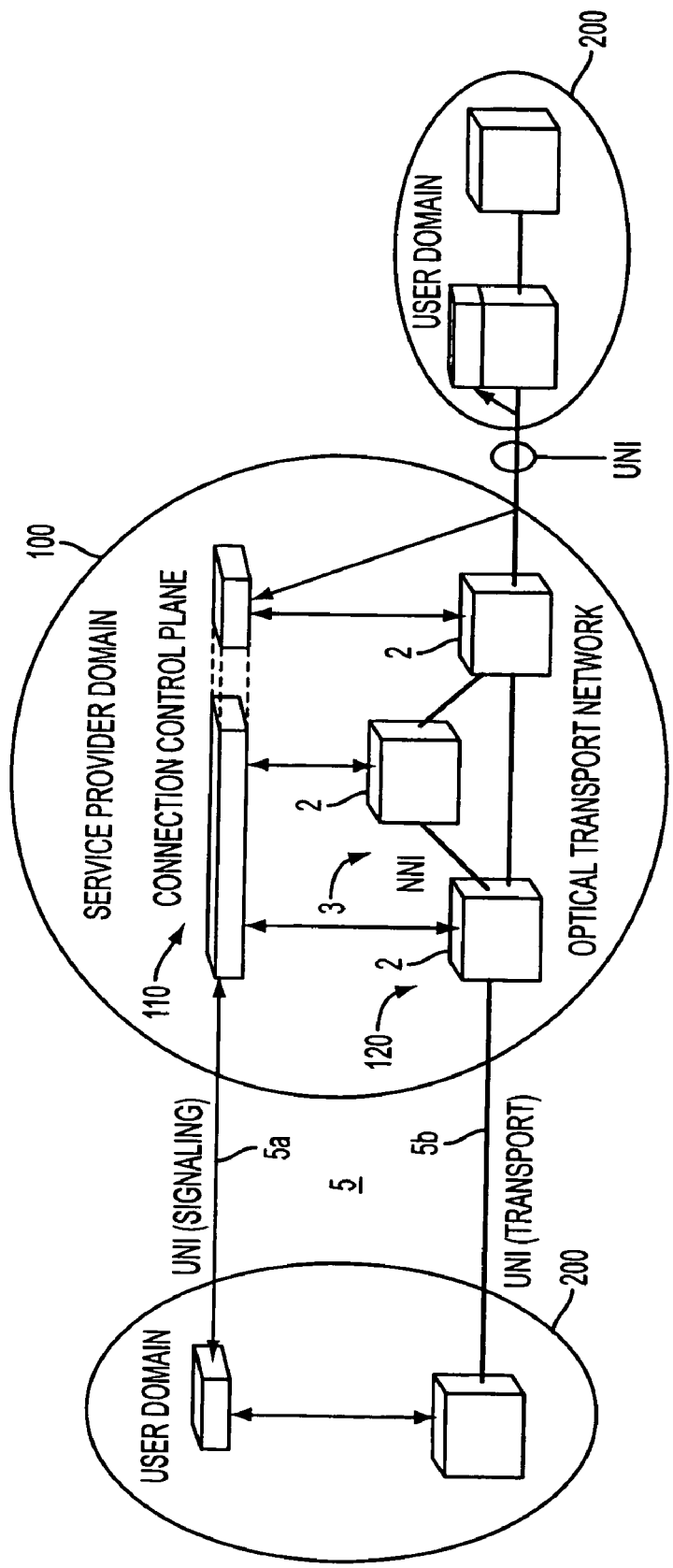
FIG. 4 is a block diagram showing details of a service provider domain and a user domain.

FIG. 4 is a block diagram showing an O-UNI reference model. A service provider domain 100 communicates with user domains 200 over the O-UNI 5. The service provider domain 100 includes a connection control plane 110 and an optical transport network 120 connected over an NNI 3. The service provider domain 100 and the user domain 200 conduct signaling over a first UNI path 5a between the user 200 and the connection control plane 110 and conduct transport over a second UNI path 5b between the user 100 and the optical transport network 120.

Figure 5:
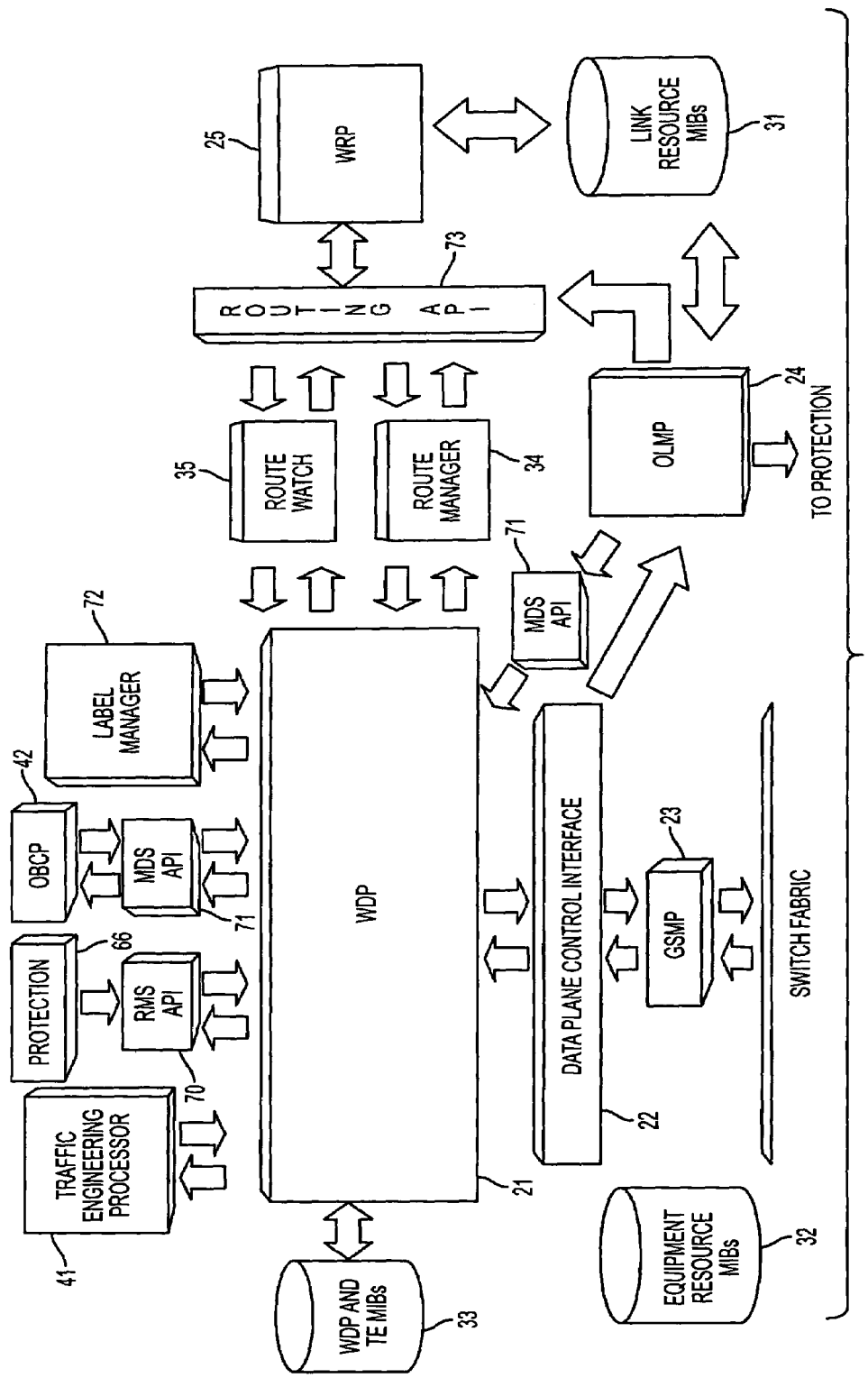
FIG. 5 is a block diagram illustrating details of the control configuration.

FIG. 5 is a block diagram showing control blocks and an application program interface (API) among WDP, WRP and the other protocols. Application Program Interface (API) is a set of routines, protocols and tools for building software applications. Core services include WDP 21, a data plane control interface 22, Generic Switch Management Protocol (GSMP) 23, OLMP 24, WRP 25, and protection 26. Target services include a traffic engineering processor 41 and OBCP 42. Link, switch, and protection management resources include link resource management information bases (MIBs) 31, equipment resource MIBs 32, WDP and Traffic Engineering (TE) MIBs 33, route manager 34 and route watch 35. An MIB is a database of objects that can be monitored by a network management system. A label manager 72 functions through WDP 21.

Figure 6:
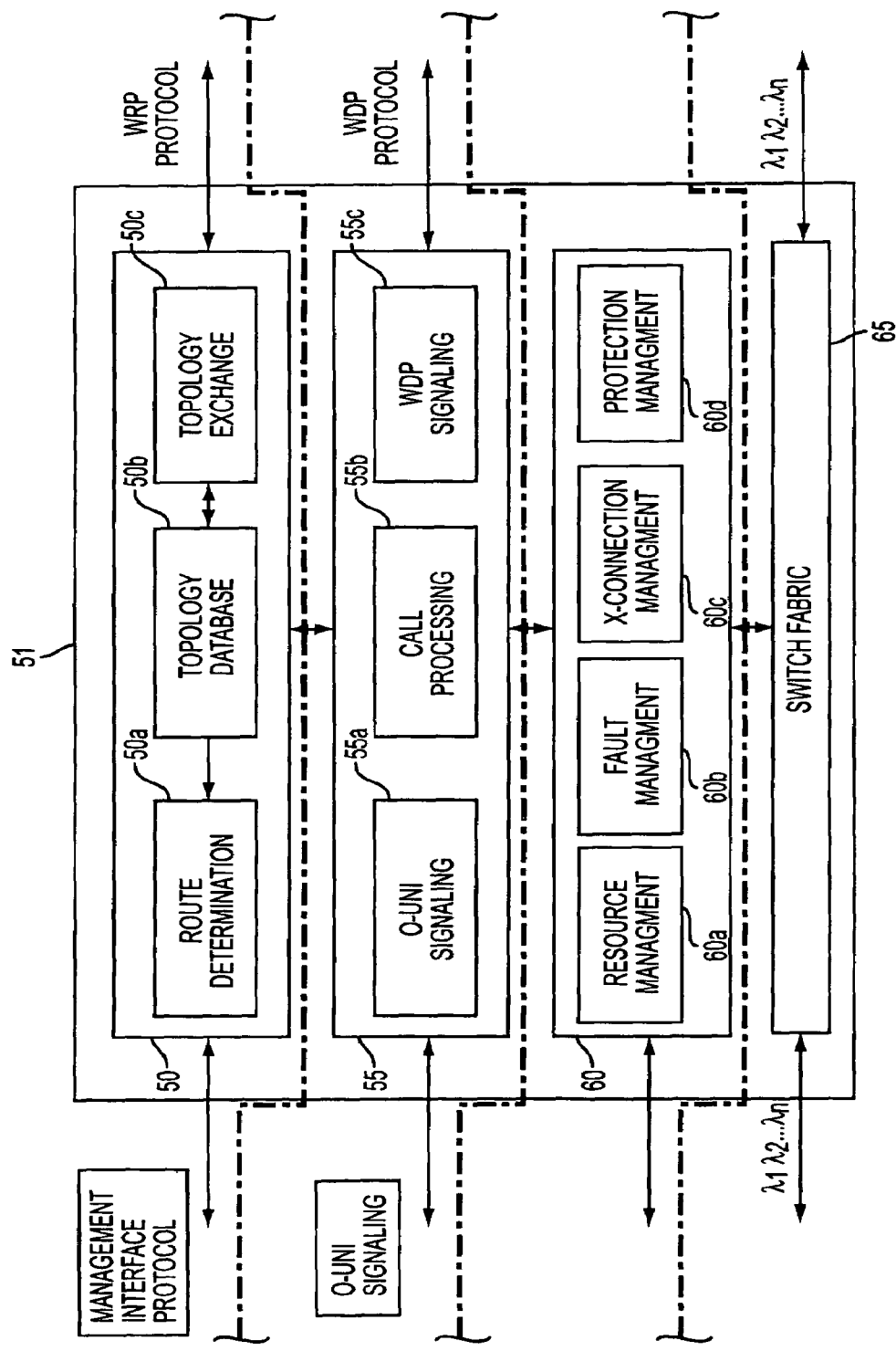
FIG. 6 is a block diagram illustrating system control architecture for an optical switch.

FIG. 6 illustrates system control architecture 51 for an optical switch. Management interface protocol and WRP protocol interact with route determination tools 51a, a topology database 50b, and topology exchange 50c. O-UNI signaling and WDP protocol provide services such as O-UNI signaling 55a, call processing 55b, and WDP signaling 55c. The control architecture 51 also includes tools for resource management 60a, fault management tools 60b, x-connection management tools 60c, protection management tools 60d, and switch fabric 65.

Figure 7:
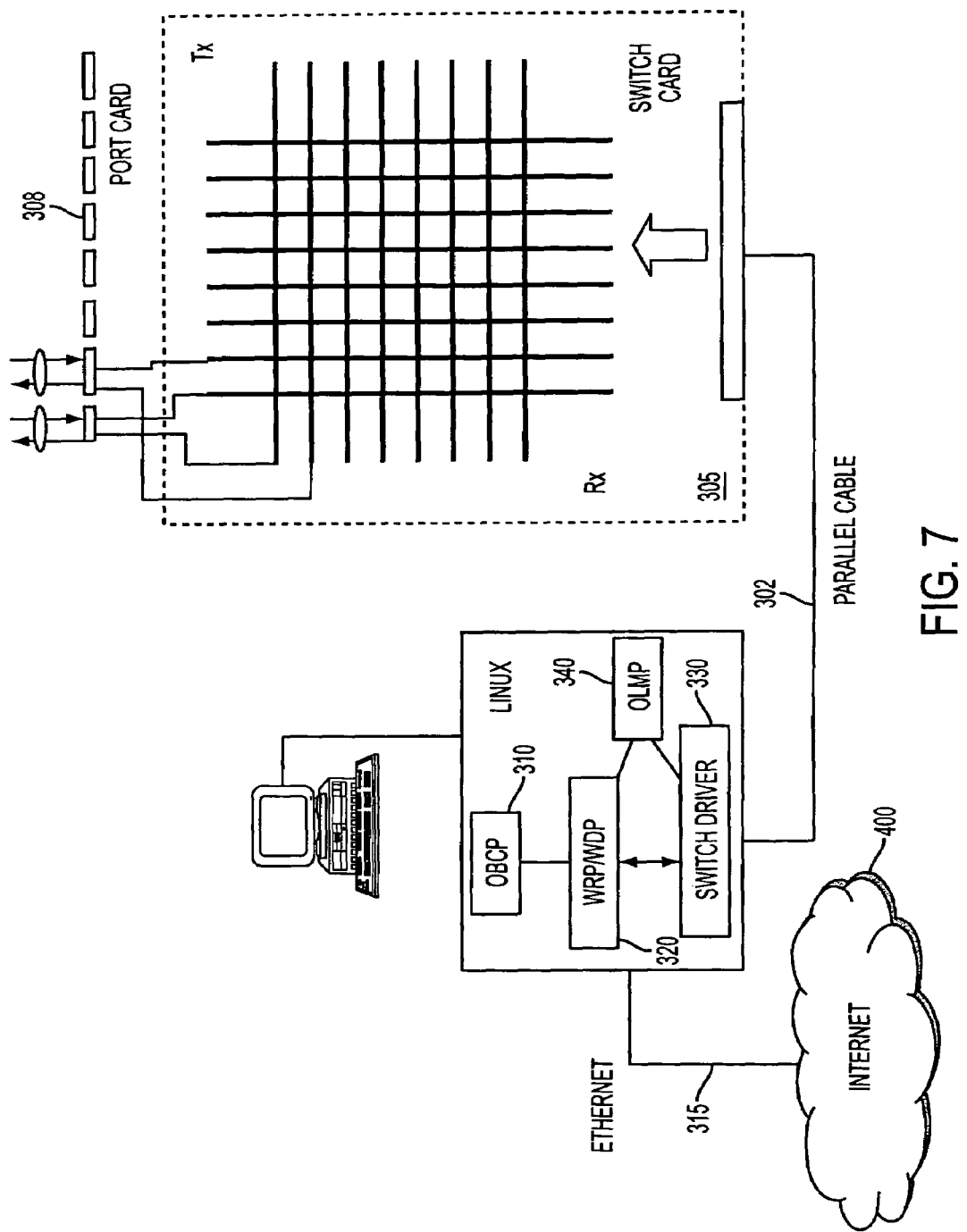
FIG. 7 is a block diagram illustrating a system control configuration.

FIG. 7 illustrates an example of a system control configuration. The service provider 100 implements OBCP 310, WRP/WDP 320, and OLMP 340 and includes a switch driver 330. A parallel cable 302 attaches to a switch card 305, which is attached to a port card 308. The service provider 300 communicates with the Internet 400 through an Ethernet 315.

FIG. 8 illustrates the mechanisms that the service provider 300 uses to constrain optical route flooding. An optical interface descriptor (OID) is attached to each optical LSA. The optical interface descriptor contains information relevant to each user group such as a user termination point 112, user group identifier 114, user contract ID 116, and user service mode 118. The service mode 118 is expressed as a Type Length Value (TLV) which in a preferred embodiment is a 32 bit integer component with a value between 1 and 3. The user service mode 118 has a different TLV for each of the modes described above such as the peer-to-peer mode, the overlay mode, and the augmented mode. A first value selected for the overlay model indicates that no route information is flooded into the user domain. A second value selected for the augmented model indicates that route information may be flooded into the user domain, and a third value for the peer-to-peer model indicates that all optical route information is flooded into the user domain. The OID is also represented by a TLV which is preferably a 32 bit integer. A value of 255.255.255.255 preferably indicates a broadcast group. A value of 0 preferably represents a disabled group. Other values represent specific user groups.

In addition to the OID, the mechanisms for constraining optical route flooding include an optical link administrative domain 120. The administrative domain includes a link color 122, either a broadcast indicator 123a or a block indicator 123b, and an user group ID 125. If the propagating LSA is a service LSA 130, the service LSA 130 includes an expanded OID 132. The OID 132 additionally includes a user service type 133, such as ATM or IP, a control protocol 134 such as Border Gateway Protocol (BGP) or Private Network Network Interface (PNNI), a framing protocol such as GE, OC-X, or fiber channel, and a link color 134.

Prior to connecting, an optical switch must check a user status TLV. The user status TLV is preferably a 32 bit integer having a value between 0 and 3. A first value indicates "out of service". A second value indicates "idle". A third value indicates "busy" and unavailable and fourth value indicates "testing" and temporarily unavailable.

Figure 9:
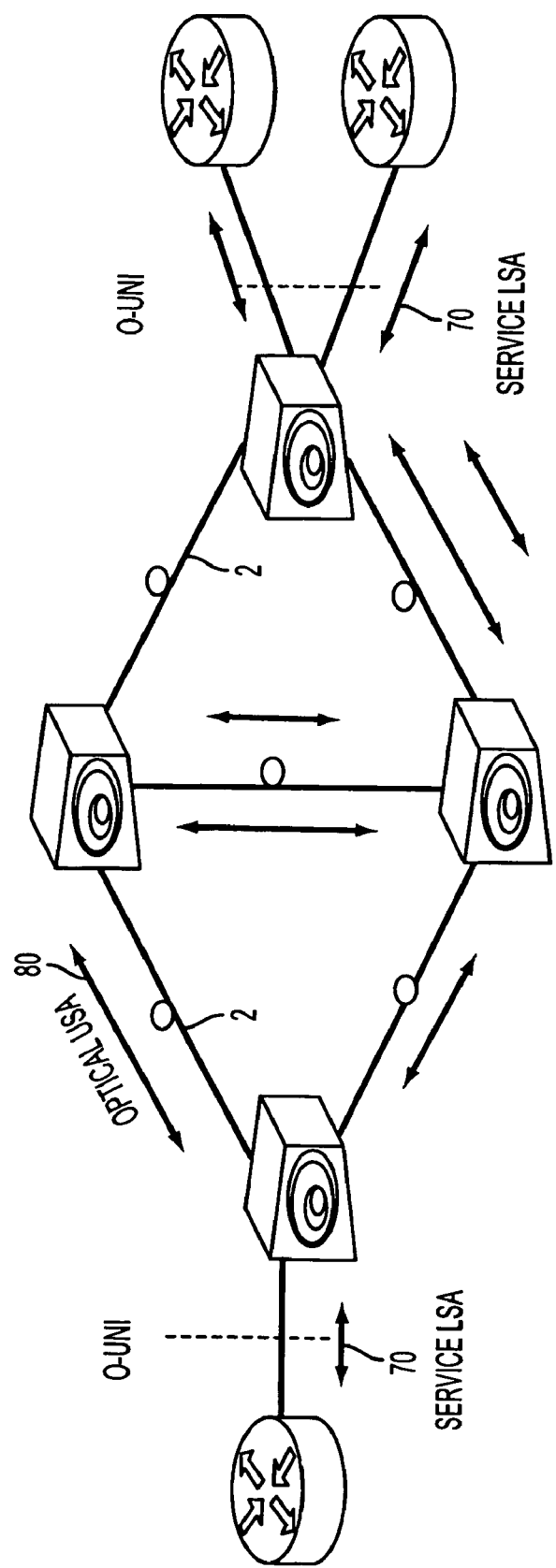
FIG. 9 is a flow chart illustrating optical and service LSA propagation.

FIG. 9 is a diagram showing the propagation of the service LSA 70 over an O-UNI and the propagation of an optical LSA 80 over an NNI between the links 2. In operation, the WRP floods the service LSA 70 and the optical LSA 80. Optical switches check the administrative domain to determine whether it indicates that the LSA should be broadcast or blocked. WDP issues a connection request and checks the OID, the UNI interface type and available bandwidth. If the appropriate criteria are met, the request will be accepted. Otherwise, the request will be denied.

Figure 10:
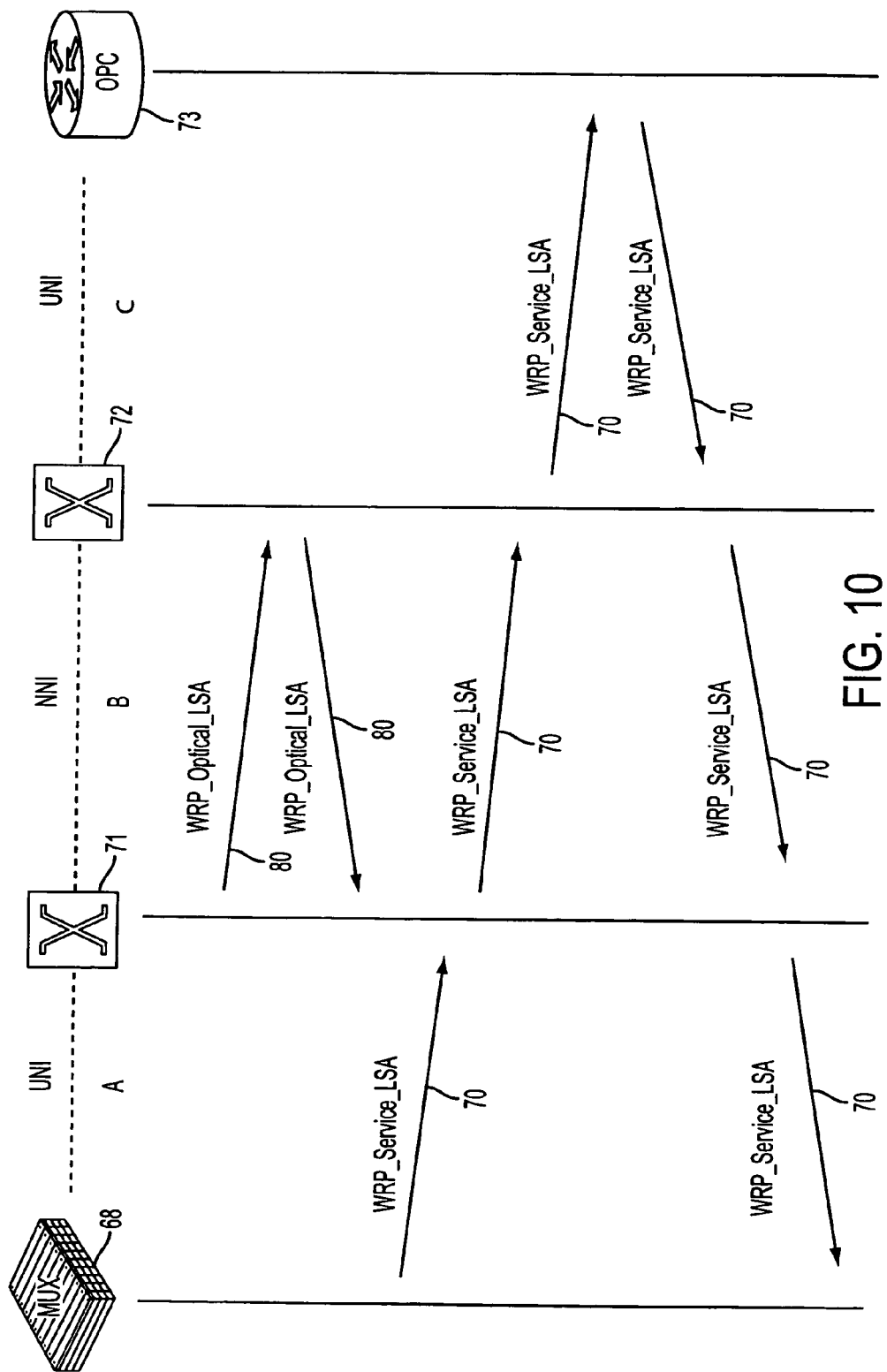
FIG. 10 is a flow chart showing routing of optical and service LSAs.

FIG. 10 illustrates control message routing. As shown in section A, a service LSA 70 is propagated over a UNI A from a multiplexer (MUX) 68 to a first switch 71. Both an optical LSA and a service LSA are propagated over an NNI B between the switches 71 and 72. The service LSA is propagated from the switch 72 over a UNI C to an OPC 73.

Figure 11:
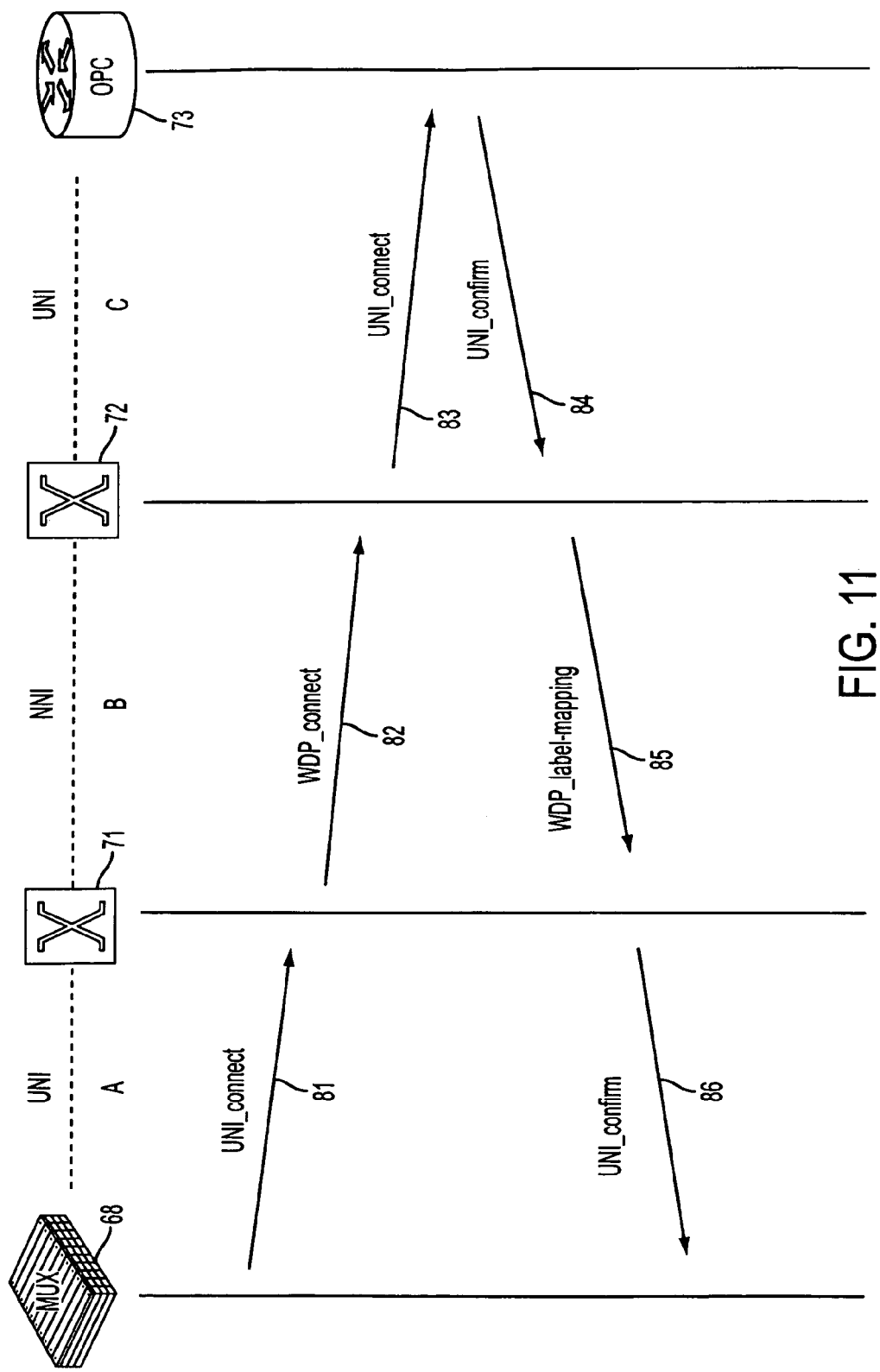
FIG. 11 is a flow chart illustrating control message signaling.

FIG. 11 is a signaling flow chart showing UNI connect signaling 81 from the MUX 68 over the UNI A to the switch 71. WDP connect signaling 82 is sent from the switch 71 over the NNI B to the switch 72. The switch 72 sends UNI connect signaling 83 over the UNI C to OPC 73. OPC 73 sends UNI confirm signaling 84 over the UNI C to switch 72. The switch 72 sends WDP lapel mapping signaling 85 over the NNI B to the switch 71 and the switch 71 sends UNI confirm signaling 86 over the UNI A to the MUX 68.

Figure 12:
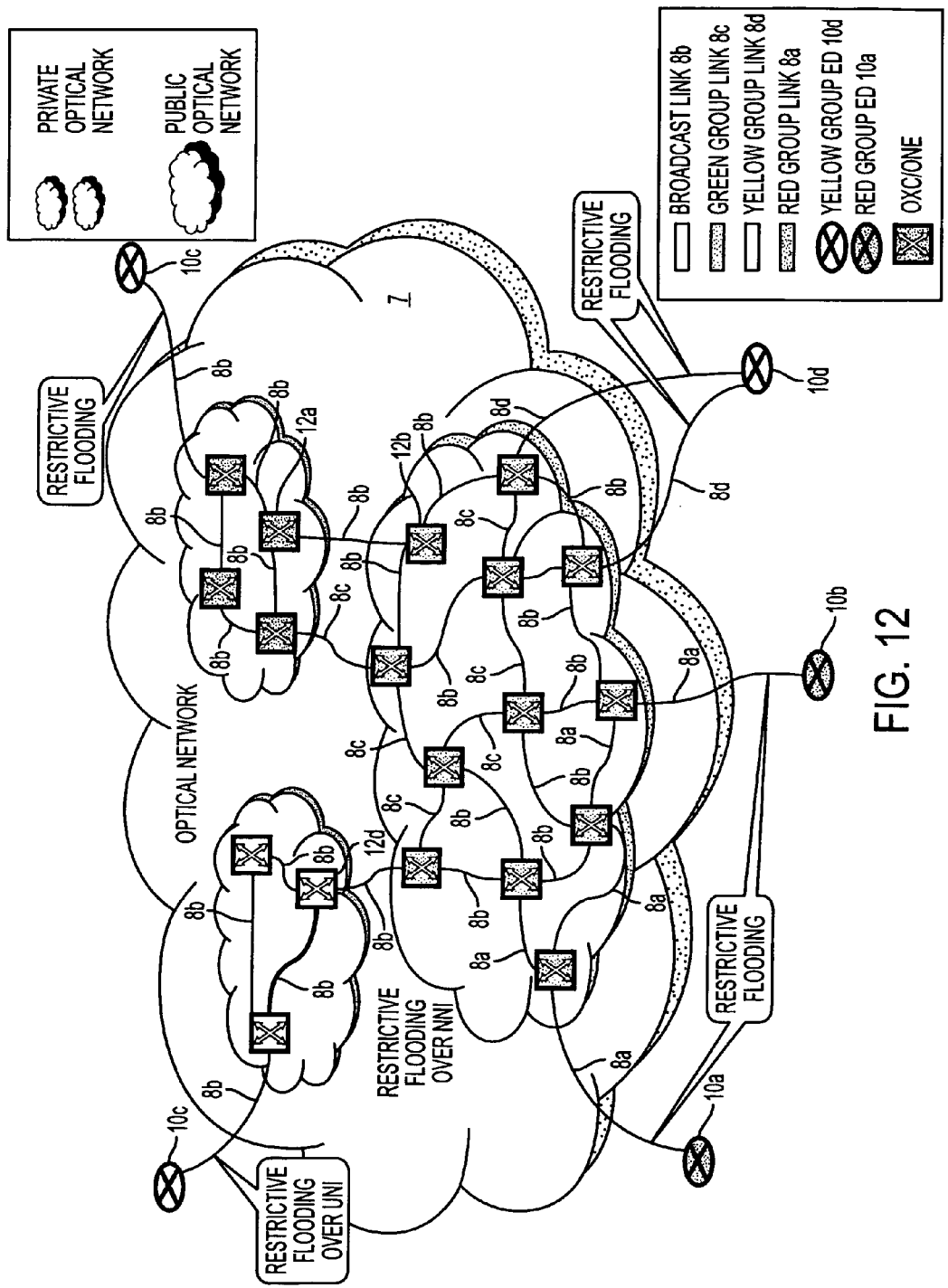
FIG. 12 illustrates an embodiment of an optical network with user routing domain partitioning.

FIG. 12 shows an optical network 7 with user routing domain partitioning. Links 8a belong to a first color group, links 8b are broadcast links, 8c belong to a second color group, and links 8d belong to a third color group. Edge Device (ED) 12a represents a first color group and ED 10d represents a second color group. As shown, restrictive flooding is conducted over the links 8a–8d. Restrictive flooding is performed both over the UNI and the NNI.

Figure 13:
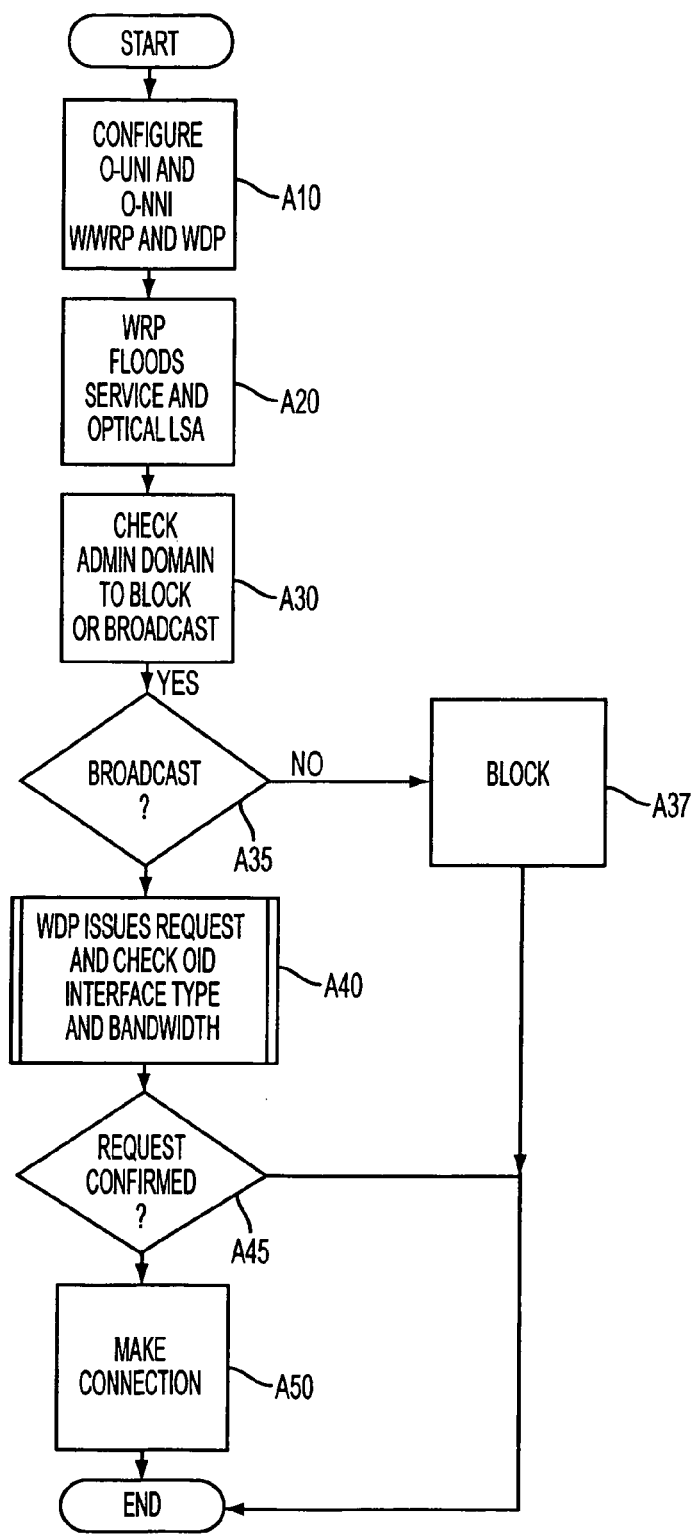
FIG. 13 is a flow chart illustrating a method of LSA propagation.

FIG. 13 is a flow chart showing a first embodiment of the method of the invention using WDP and WRP. In step A10, the system configures the O-UNI and the O-NNI for each link. In step A20, WRP floods both a service LSA and an Optical LSA. In step A30, optical switches check the flooding domain to determine whether to broadcast or block the propagation. If in step A35, the system determines that the LSA should not be broadcast, it blocks the propagation in step A37. If in step A35, the system determines that it should broadcast the propagation, WRP further checks if the flooding domain, user group and link color match with the information contained in the LSA, in step A40. If all these parameters are matched. WRP will flood the LSA to user device in step A45. If they are not matched. WRP will block this flooding.

The comparison in step A40 is performed as follows.

Upon receiving an LSA, an optical switch checks the information attached to the LSA. The specific information that is attached to an LSA depends upon the type of LSA. Assuming the LSA is an optical LSA, the switch checks the information for each possible (outgoing) link to determine if the LSA should be flooded over that link. In the embodiment explained above, if the outgoing link OID is 255.255.255.255, the switch floods the LSA. If the outgoing link OID is 0, the switch does not flood the LSA over the link. If the outgoing OID is another value, the switch compares the incoming OID to the outgoing OID. If the values match, the switch floods the LSA. If the values do not match, the switch does not flood the LSA.

The above-described technique may be used with open shortest path first. Open Shortest Path First (OSPF), is a routing protocol developed for IP networks based on the shortest path first or link-state algorithm. Routers use link-state algorithms to send routing information to all nodes in an internetwork by calculating the shortest path to each node based on a topography of the internet constructed by each node. Each router sends that portion of the routing table that describes the state of its own links and it also sends the complete routing structure or topography. If using OSPF, the optical switch will compare the OID of an incoming LSA with the link information or OID for all outgoing links to determine which link should be flooded.

Figure 14:
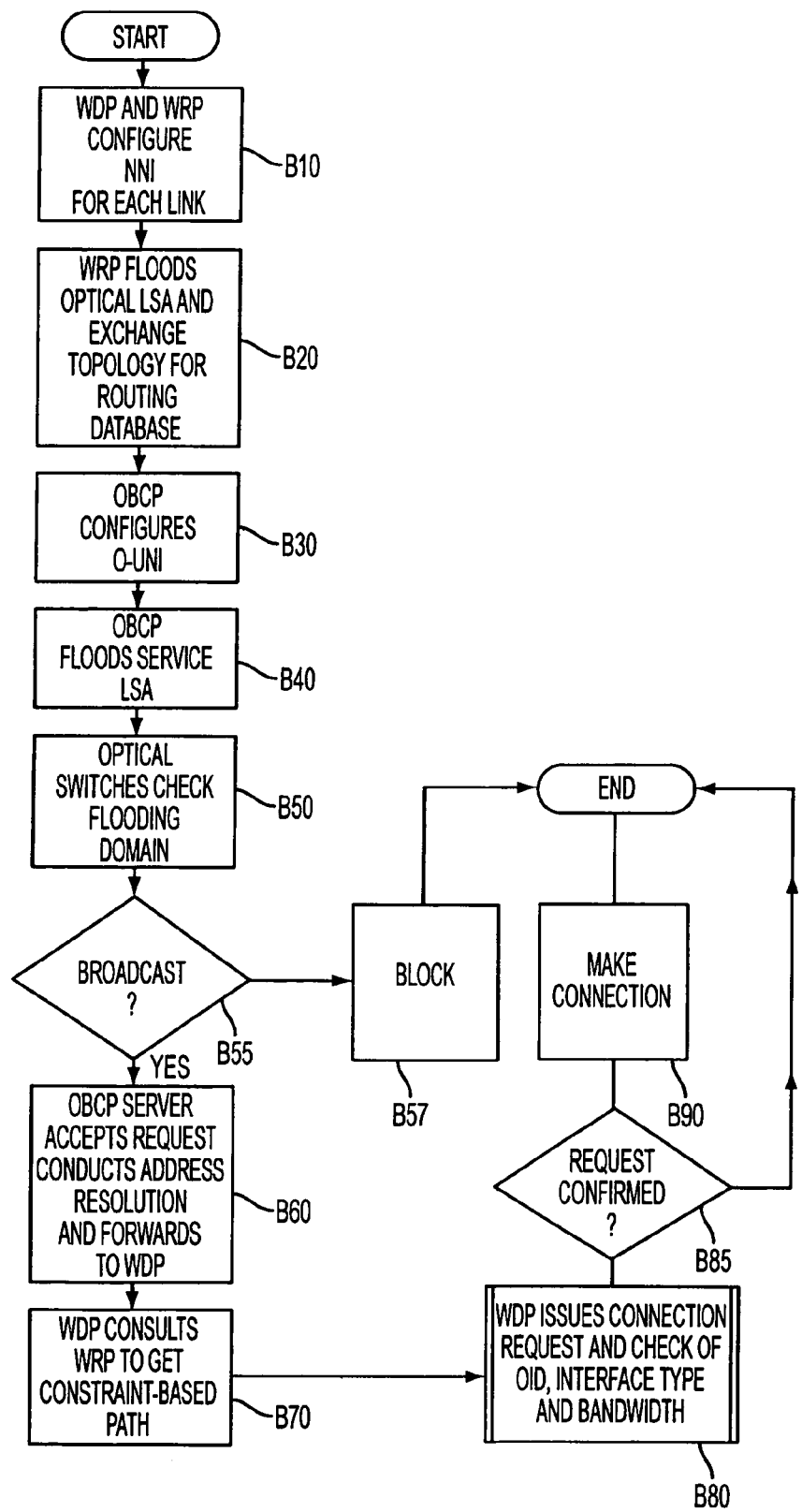
FIG. 14 is a flow chart illustrating an additional method of LSA propagation.

FIG. 14 illustrates a second embodiment of optical LSA and service LSA propagation using WRP, WDP, and OBCP. In step B10, the WRP and WDP configure the NNI for each optical link. In step B20, WRP floods the optical LSA and exchange topology for the routing database. In step B30, the OPCP configures the O-UNI for each service access link. In step B40, OBCP floods the service LSA. In step B50, optical switches check the flooding domain to decide whether to broadcast or block the propagation of the service LSA to another OBCP server. If it is determined in step B55, that the LSA should not be broadcast, the LSA is blocked in step B57. If in step B55, it is determined that the LSA should propagate, the OBCP server accepts the service LSA and stores this information in its database. The OBCP server may distribute this information to the according user devices via O-UNI proxy agents in step B57. On the other hand, the O-UNI proxy in step B60 will accept the connection request from user devices and conducts address resolution and forwards the request to WDP. In step B70, WDP consults with WRP to get a constraint based path. The constraint based path can be determined from the routing database accessed in step B20. In step B80, WDP issues a connection request with and checks the UNI interface type, OID, and available bandwidth. This check is performed substantially as described above with reference to FIG. 13. Based on the results of the check in step B85, the connection may be made in step B90.

FIG. 15 is a chart illustrating an embodiment of the flooding restrictions for each of the three above-mentioned service models. The service models are listed in column A and the LSA types including the service LSA, the optical LSA, and other LSAs are listed in the first row. Cell A0 represents other service modes. As shown in cells, B0, C0, and D0, the LSAs are blocked for service modes which are not supported by the system of the invention. Cell A1 represents the overlay mode. In the overlay mode, service LSAs are flooded as shown in B1, while optical and other LSAs are blocked as shown in C1 and D1. Cell A2 represents the augmented mode. In the augmented mode, both service LSAs and optical LSAs are flooded as shown in B2 and C2. However, other LSAs are blocked as shown in D2. The Peer-to-Peer model is represented in cell A3. In the peer-to-peer model, all LSAs are flooded as shown in B3, C3, and D3.

Figure 16:
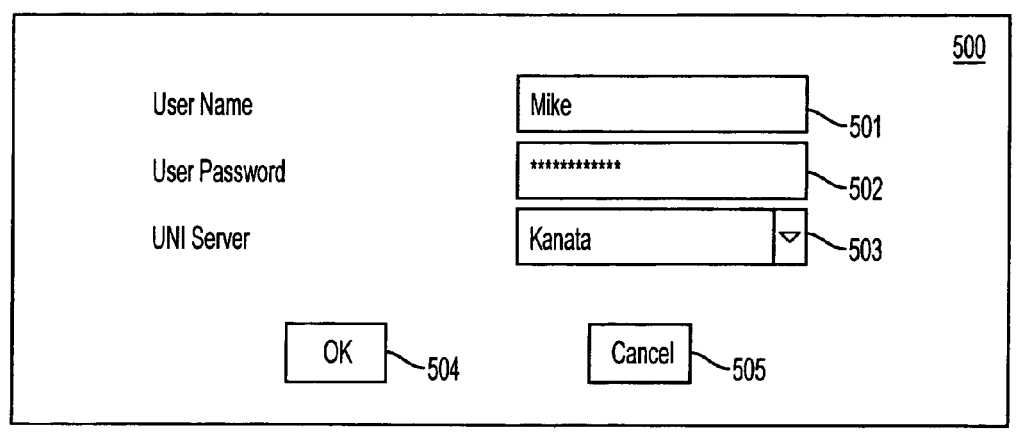
FIG. 16 illustrates an embodiment of an UNI login graphic user interface (GUI)

From the standpoint of the user, the UNI login graphic user interface (GUI) is shown in FIG. 16. The login GUI 500 includes a user name entry blank 501, a password entry blank 502, a UNI server blank 503, an OK button 504, and a cancel button 505.

Figure 17:
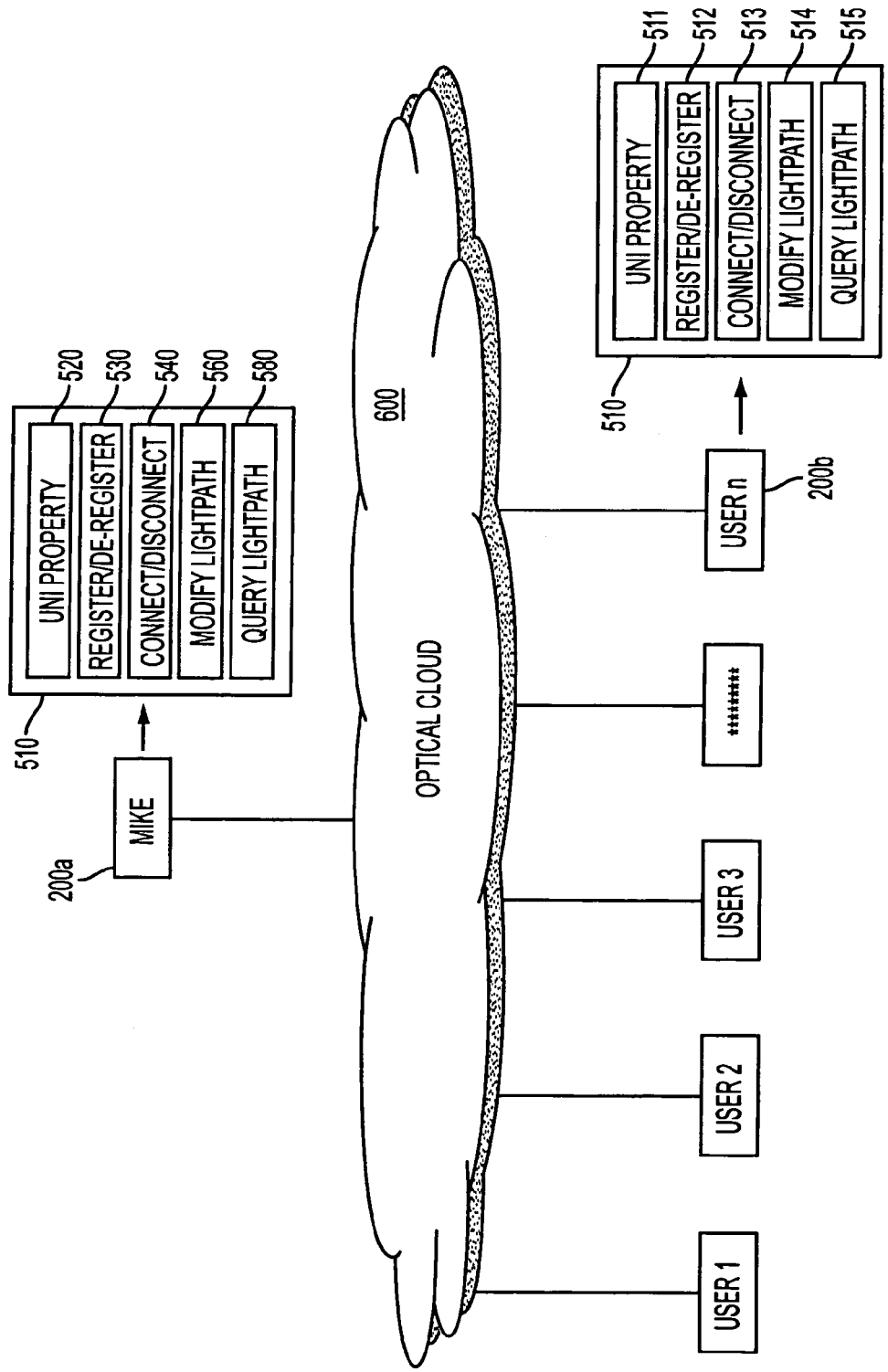
FIG. 17 illustrates a UNI main GUI.

From a system perspective, a UNI main GUI 510 is shown in FIG. 17. The users such as Mike at 200a and user n at 200b are connected through the above-described optical components 600. The main GUI displays a UNI property 520, a register/de-register option 530, a connect/disconnect option 540, a modify lightpath option 560, and a query lightpath option 580.

Figure 18:
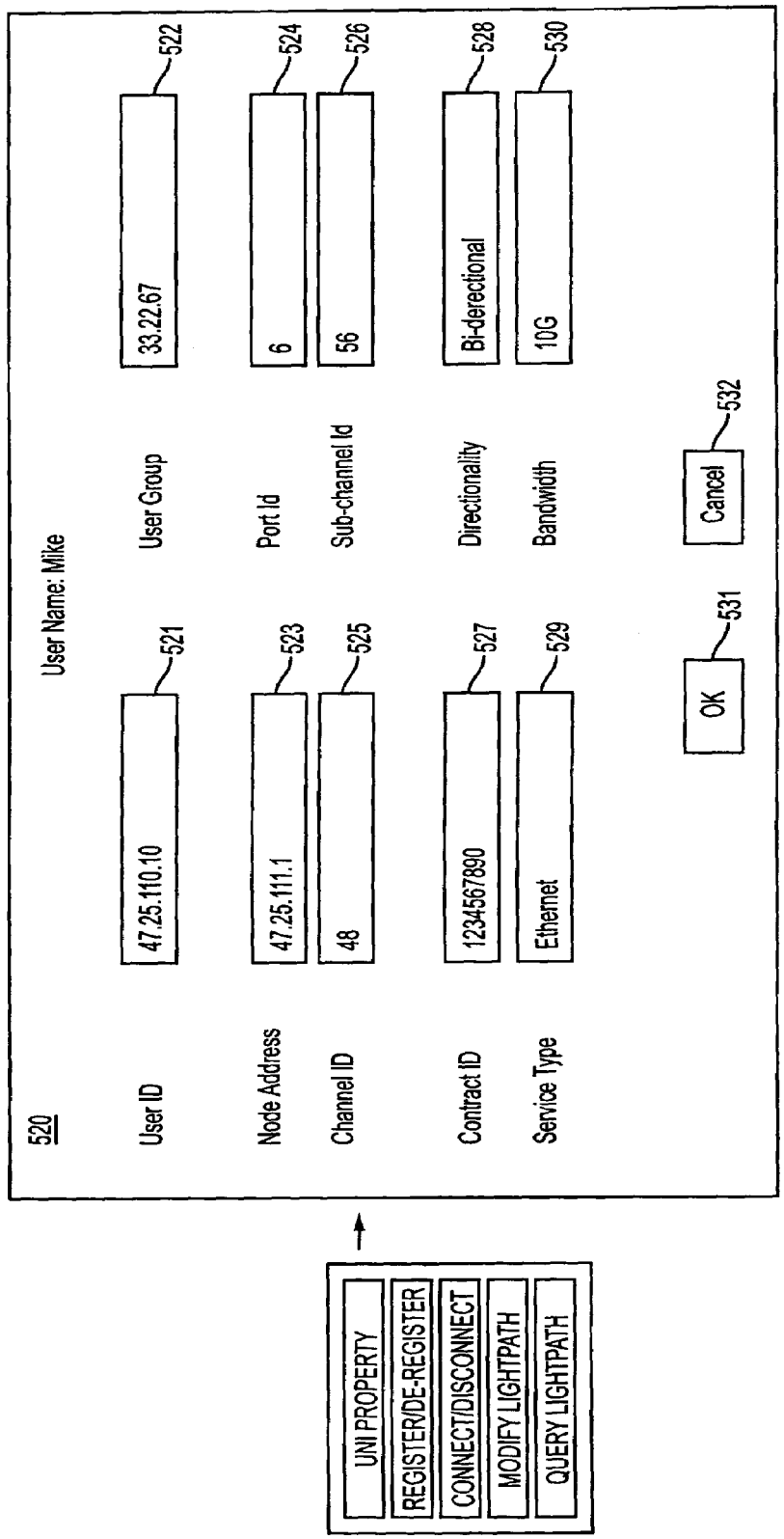
FIG. 18 illustrates an embodiment of a UNI property GUI.

The UNI property GUI is shown in FIG. 18. The GUI 520 includes information such as user ID 521, user group 522, node address 523, port ID 524, channel ID, 525, subchannel ID 526, contract ID 527, directionality 528, service type 529, and bandwidth 530. OK option 531 and cancel option 532 are available.

Figure 19:
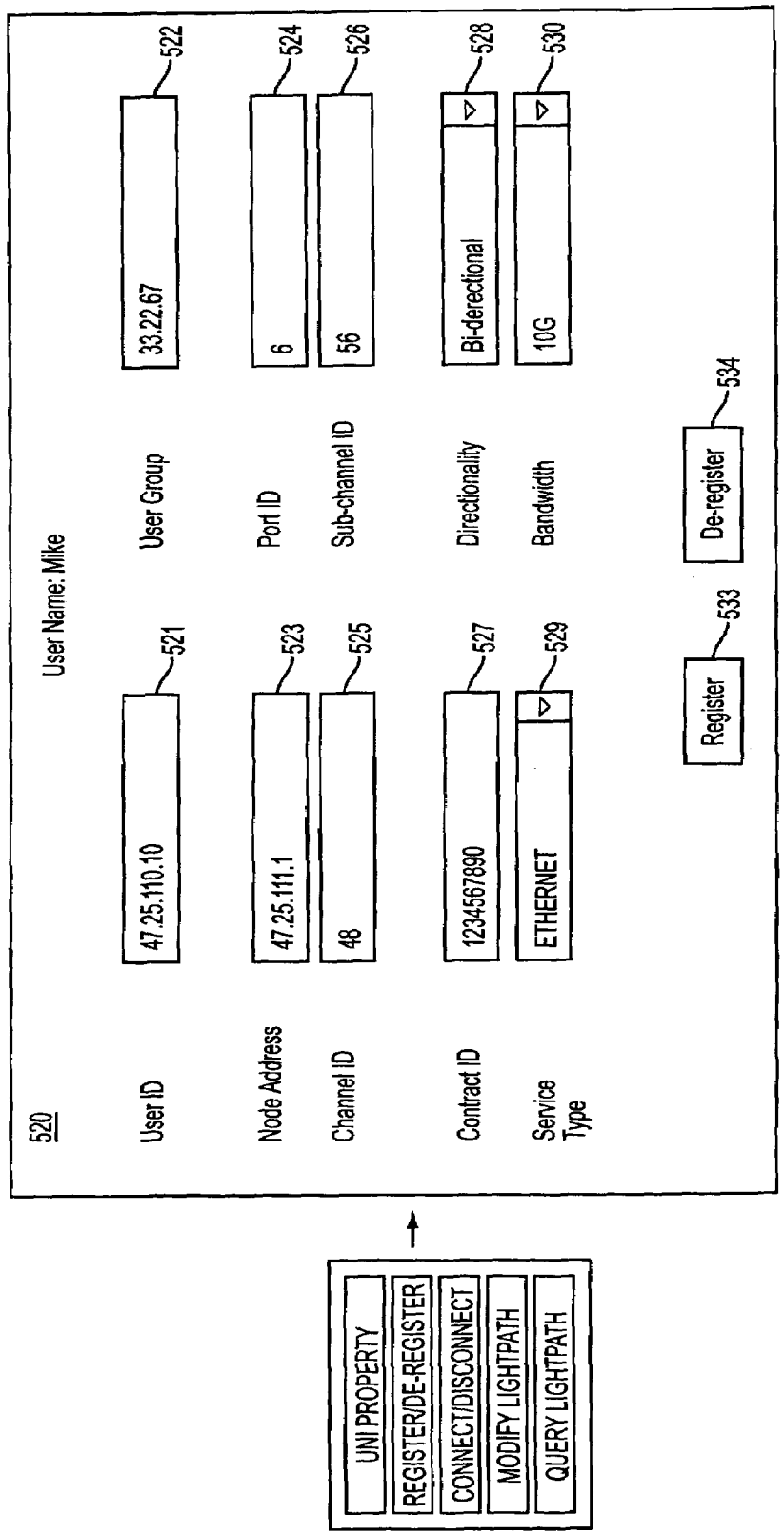
FIG. 19 illustrates an embodiment of a UNI Register/De-Register GUI.

For registration, the GUI 520 offers several more options shown in FIG. 19. Specifically, the directionality 528, the service type 529, and the bandwidth 530 are selectable. Registration option 533 and de-registration option 534 are provided.

Figure 20:
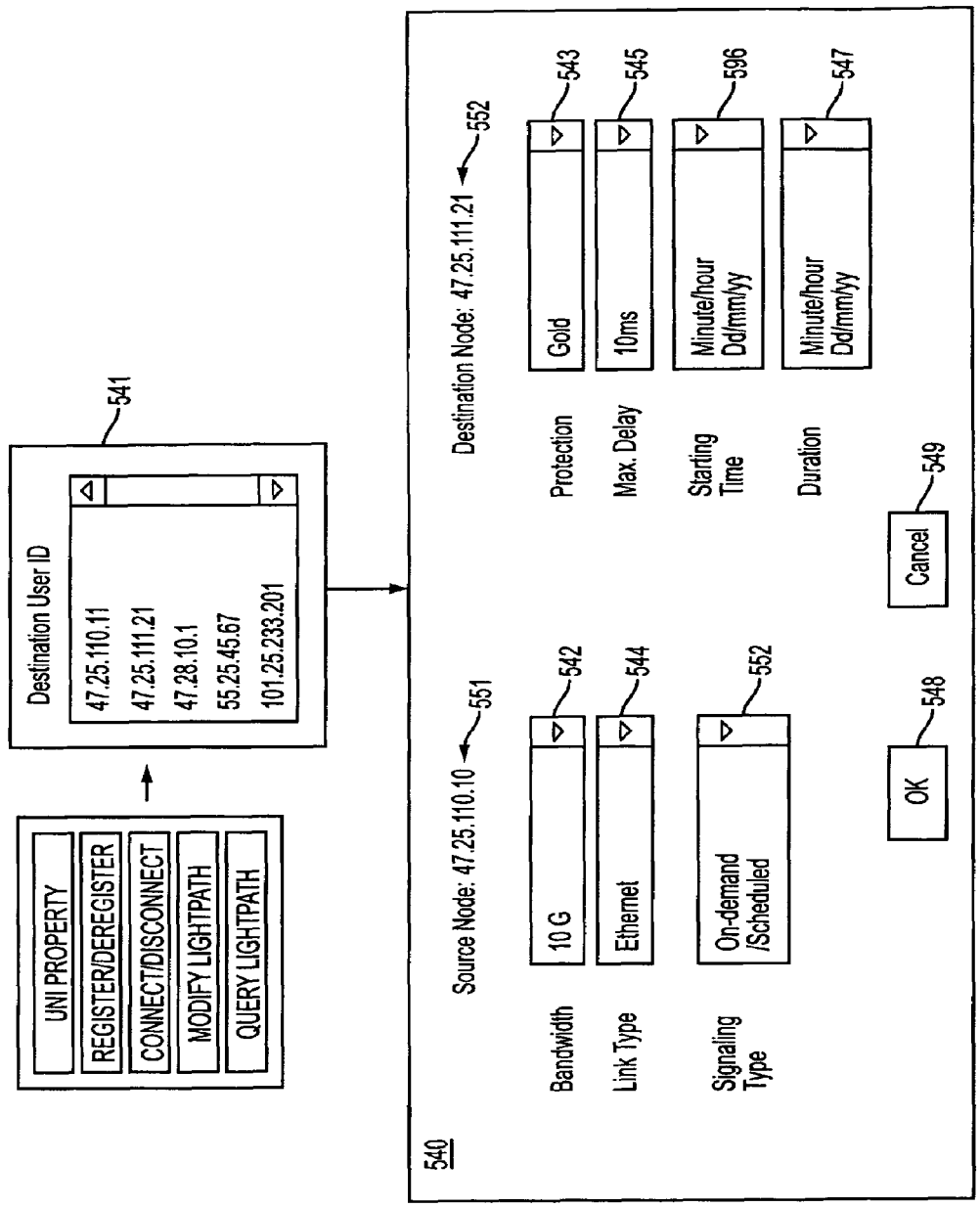
FIG. 20 illustrates an embodiment of a UNI connect/disconnect GUI.

FIG. 20 shows an embodiment of the UNI connect/disconnect GUI 540. From a destination user ID 541, the system locates the intended destination. The source node 551 and the destination node 552 appear at the top of the GUI 540. Bandwidth 542, protection level 543, link type 544, maximum delay 545, signaling type 552, starting time 546, and duration 547 are shown on the GUI 540. All parameters except the starting time 546 and duration 547 are selectable. On OK button 548 and a cancel button 549 are provided.

Figure 21:
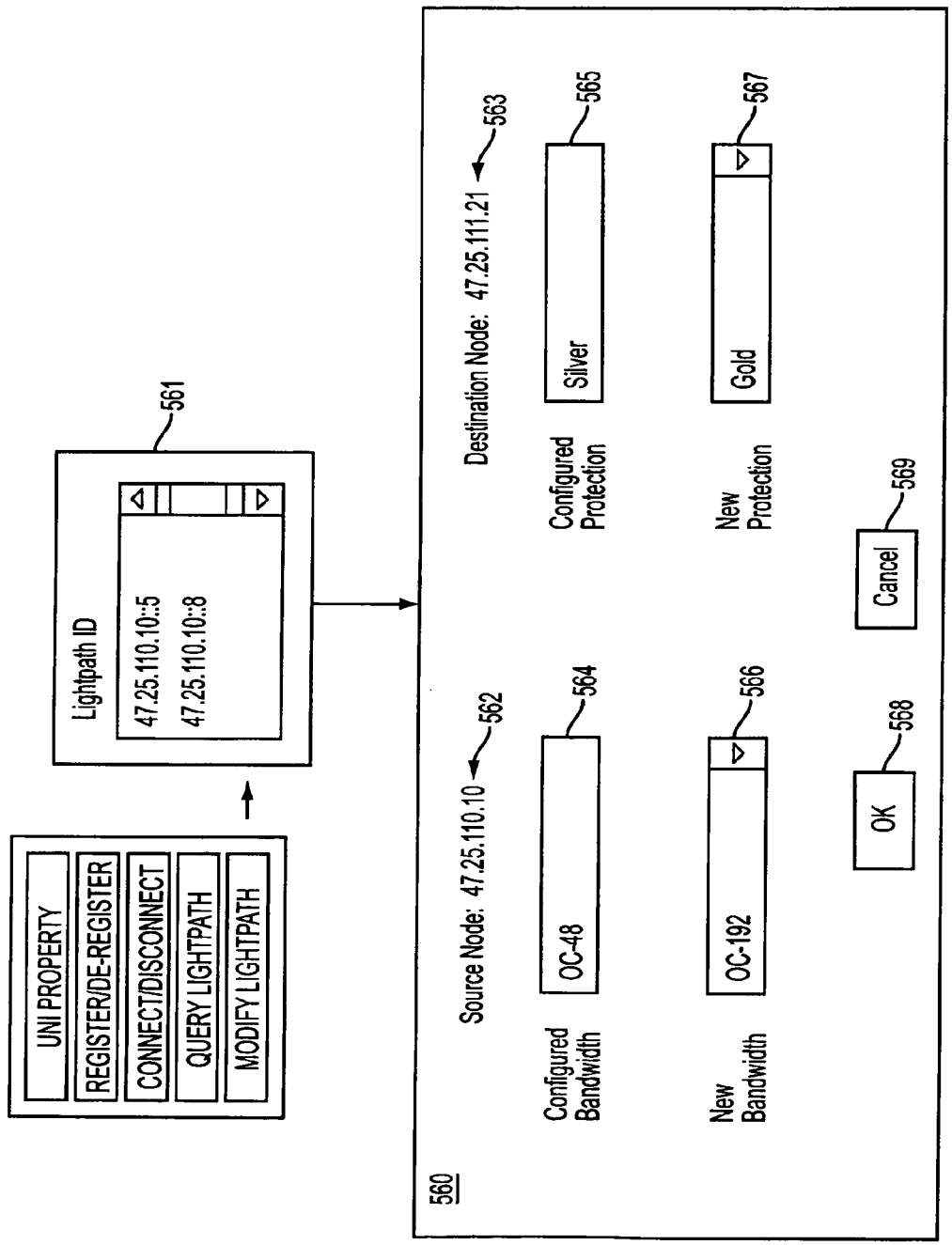
FIG. 21 illustrates an embodiment of a UNI modify lightpath GUI.

FIG. 21 shows a UNI modify lightpath GUI 560. The lightpath ID 561 is entered. The source node 562 and destination node 563 are shown. The GUI 560 also shows the configured bandwidth 564 and the configured protection 565. Selectable parameters include new bandwidth 566 and new protection 567. Options include an OK option 568 and a cancel option 569.

Figure 22:
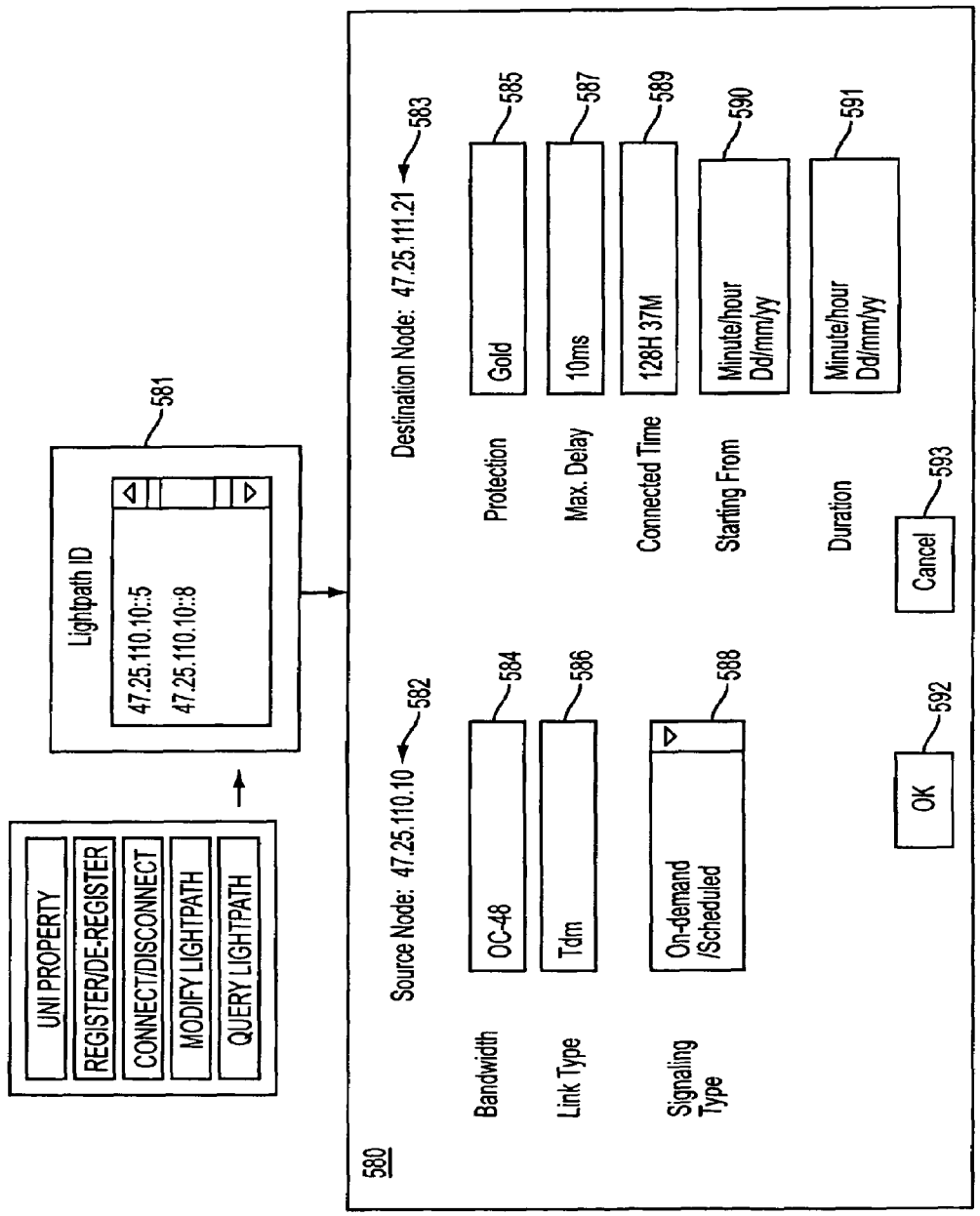
FIG. 22 illustrates an embodiment of a query light path GUI.

FIG. 22 shows a query lightpath GUI 580. The lightpath ID 581 is identified. The GUI 580 also identifies a source node 582 and a destination node 583. The parameters displayed include bandwidth 584, protection 585, link type 586, maximum delay 587, signaling type 588, connected time 589, starting time 590, and duration 591. The signaling type 588 is selectable. An OK button 592 and a cancel button 593 are provided.

The management system provides a hybrid optical service model that uses user-domain constrained optical route flooding to support multiple service models. The optical interface descriptor (OID) is defined to restrict the flooding domain. An optical LSA and a service LSA propagate the OID. The system adds value to Internet Engineering Task Force (IETF) and OIF standard activities.

The management structure includes multiple identifiers for determining route flooding procedures. An optical interface descriptor (OID) includes information such as a user termination point, a user group id, a user contract ID, and a user service mode. An optical link administrative domain includes a customized link-related identifier (link color), a first value that indicates broadcasting, a second value that indicates blocking, or a specific user group ID for assisting with the flooding determination. An optical service link state advertisement is an extension to an optical link state advertisement (OLSA) and includes an optical interface descriptor TLV with additional information a user service type, control protocol, framing protocol, OID, and link color.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A method for routing information over an optical network supporting multiple optical service models, the method comprising:
   receiving a link state advertisement at a switch;
   checking flooding domain information to decide whether to broadcast or block propagation of the link state advertisement, wherein checking the flooding domain information comprises checking an optical UNI interface type, an optical interface descriptor, and available bandwidth; and
   accepting or rejecting a request based on the flooding domain information.

2. The method of claim 1, wherein the optical interface descriptor includes a user termination point, a user contract identifier, a user group identifier, and a user service mode identifier.

3. The method of claim 2, wherein the link state advertisement includes the optical interface descriptor.

4. The method of claim 1 further comprising the step of checking a user status identifier prior to transmitting a link state advertisement and determining from the user status identifier whether the user is out of service, busy, testing, or idle.

5. The method of claim 4 further comprising blocking transmission of the link state advertisement if the user is out of service, busy, or testing, and completing transmission of the link state advertisement if the user is idle.

6. A method for routing information over an optical network supporting multiple optical service models, the method comprising:
   receiving a link state advertisement including an incoming optical interface descriptor at an optical switch;
   checking outgoing link information;
   flooding the link state advertisement over the outgoing link if the outgoing link information includes a first pre-defined value,
   blocking the link state advertisement if the outgoing link information includes a second pre-defined value; and
   comparing the incoming optical interface descriptor and the outgoing link information if the outgoing link information includes neither the first pre-defined value nor the second predefined value and flooding the link state advertisement only if the incoming optical interface descriptor includes a value matching the outgoing link information.

7. The method of claim 6, further comprising checking a user status identifier prior to transmitting a link state advertisement and determining from the status identifier whether the user is out of service, busy, testing, or idle.

8. The method of claim 7, further comprising blocking transmission of the link state advertisement if the user is out of service, busy, or testing, and completing transmission of the link state advertisement if the user is idle.

9. The method of claim 6, wherein the multiple optical service models comprise an overlay model, a peer-to-peer model, and an augmented model.

10. The method of claim 9, wherein the link state advertisement is an optical link state advertisement.

11. The method of claim 10, further comprising flooding the optical link state advertisement if the service model of the outgoing link is the augmented model or the peer-to-peer model and blocking the link state advertisement if the service model of the outgoing link is the overlay model.

12. The method of claim 9, wherein the link state advertisement is a service link state advertisement.

13. The method of claim 12, further comprising flooding the service link state advertisement in all service models.

14. The method of claim 9, wherein the link state advertisement is neither a service link state advertisement nor an optical link state advertisement.

15. The method of claim 14, further comprising blocking the optical link state advertisement if the service model is the overlay model or the augmented model and flooding the link state advertisement if the service model is the peer-to-peer model.

16. The method of claim 6, wherein the incoming optical interface descriptor comprises a user termination point, a user group ID, a user contract identifier, and a user network identifier.

17. The method of claim 16, wherein the outgoing link information includes a value selected from a first value for broadcasting, a second value for blocking, and a third value.

18. A system for routing information over an optical network having multiple optical service models, the system comprising:
   wavelength routing protocol means for flooding an optical link state advertisement to an optical switch;
   means for checking an optical interface descriptor and an administrative domain to determine whether to broadcast or block propagation of the link state advertisement, wherein checking the administrative domain comprises checking an optical UNI interface type, an optical interface descriptor, and available bandwidth; and
   wavelength distribution protocol means for issuing a connection request upon receiving a broadcast determination.

19. The system of claim 18, further comprising OBCP means for flooding a service LSA.

20. The system of claim 18, wherein the wavelength distribution protocol means further comprises means for receiving a constraint-based path from the wavelength routing protocol means.

21. The system of claim 20, wherein the wavelength routing protocol means comprises OSPF means for determining an optimal path.

22. The system of claim 18 further comprising status determination means for checking a user status identifier prior to transmitting a link state advertisement and determining from the user status identifier whether the user is out of service, busy, testing, or idle.

23. The system of claim 22 wherein the status determination means blocks transmission of the link state advertisement if the user is out of service, busy, or testing, and completes transmission of the link state advertisement if the user is idle.

24. A processor readable medium for providing instructions to at least one processor for delivery, the at least one processor to:
   receive a link state advertisement including an optical interface descriptor at a switch;
   check outgoing link information;
   flood the link state advertisement if the outgoing link information includes a first pre-defined value;
   block the link state advertisement if the outgoing link information includes a second predefined value; and compare the received optical interface descriptor to the outgoing link information if the outgoing link information includes neither the first pre-defined value nor the second pre-defined value and flooding the link state advertisement only if the received optical interface descriptor includes a value matching the outgoing link information.

25. The system of claim 24 further comprising checking a user status identifier prior to transmitting a link state advertisement and determining from the user status identifier whether the user is out of service, busy, testing, or idle.

26. The system of claim 25 further comprising blocking transmission of the link state advertisement if the user is out of service, busy, or testing, and completing transmission of the link state advertisement if the user is idle.

* * * * *